FIG. 1

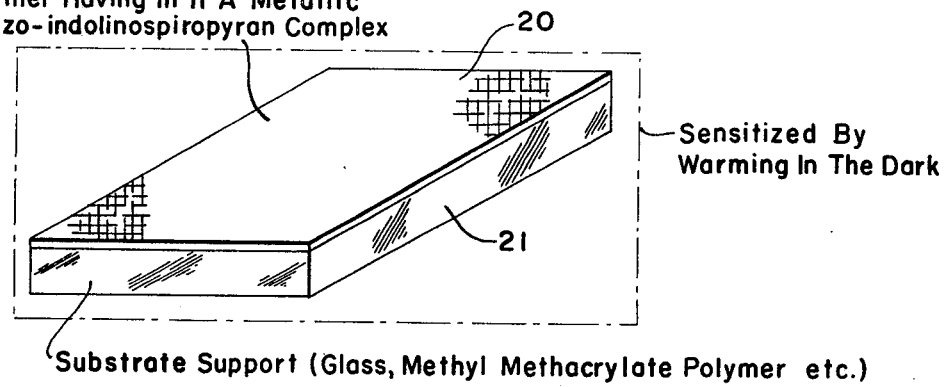

Visible-Spectrum Photo-Sensitive Layer Of Film-Former Having In It A Metallic Halide/Benzo-indolinospiropyran Complex Sensitized By Warming In The Dark Substrate Support (Glass, Methyl Methacrylate Polymer etc.)

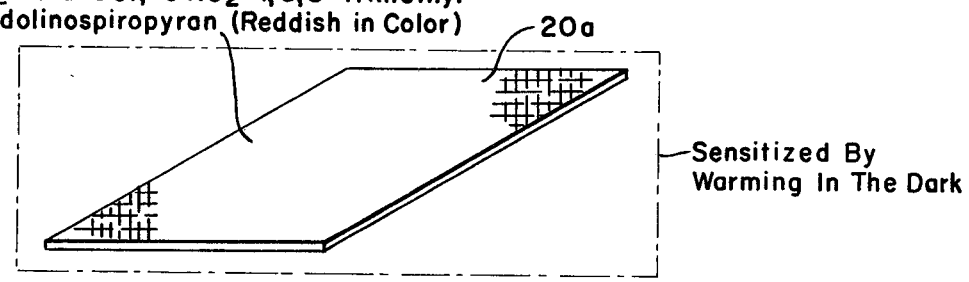

FIG. 2

Photo-Sensitive Layer (Fig. 1) For Instance Cellulose-Acetate-Butyrate With Complex Of $ZnBr_2$ And $5Cl,-6'NO_2-1,3,3$-Trimethyl Benzo-indolinospiropyran (Reddish in Color)

Sensitized By Warming In The Dark

INVENTORS
PETER L. FORIS &
WILLIAM J. BECKER

BY

THEIR ATTORNEYS

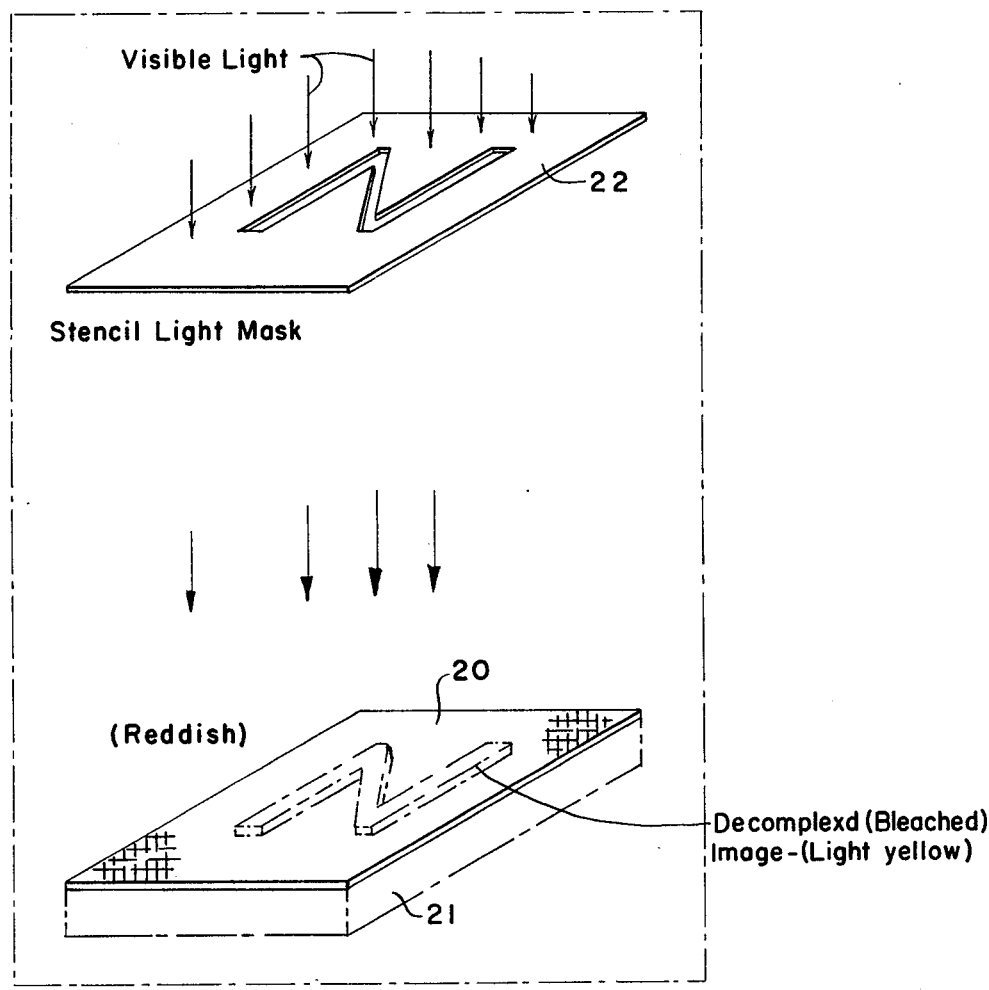

FIG. 4

Preparation of Layer-Forming Coating-Composition
and
Light-Sensitive Layer
and Image Prepare Binder Solution of Film-Forming Polymeric Material in Solvent With Metal Halide and Benzo-spiropyran Example Prepare Binder Solution

| | | In grams |
|---|---|---|
| (a) | Half-Second Cellulose-Acetate Butyrate (ASTM-D 1343-54T) 37% butyryl content (in powdered state) | 100 |
| (b) | Toluene [to solvate (a)] | 275 |
| (c) | Methyl-Ethyl-Ketone [to complete the solution] | 175 |

Add Reactants

| | | |
|---|---|---|
| (d) | Binder Solution | 55 |
| (e) | 5Cl-6'NO$_2$-1,3,3,-trimethoxy-benzo-indolinospiropyran | 1.963 (0.0055 mol) |
| (f) | ZnBr$_2$ (added as a solution in 10 milliliters of ethyl alcohol May be warmed to complete the solution.) | 1.225 (0.0054 mol) |

↓

Coat On Substrate and Dry

↓

Keep Dark

Warm to 75°C for 15 minutes (more or less) until "Complex" Forms as Indicated by Reddish Hue

↓

Form Precursor (Light Yellow) Image by Exposing Desired Areas to Strong Visible Light

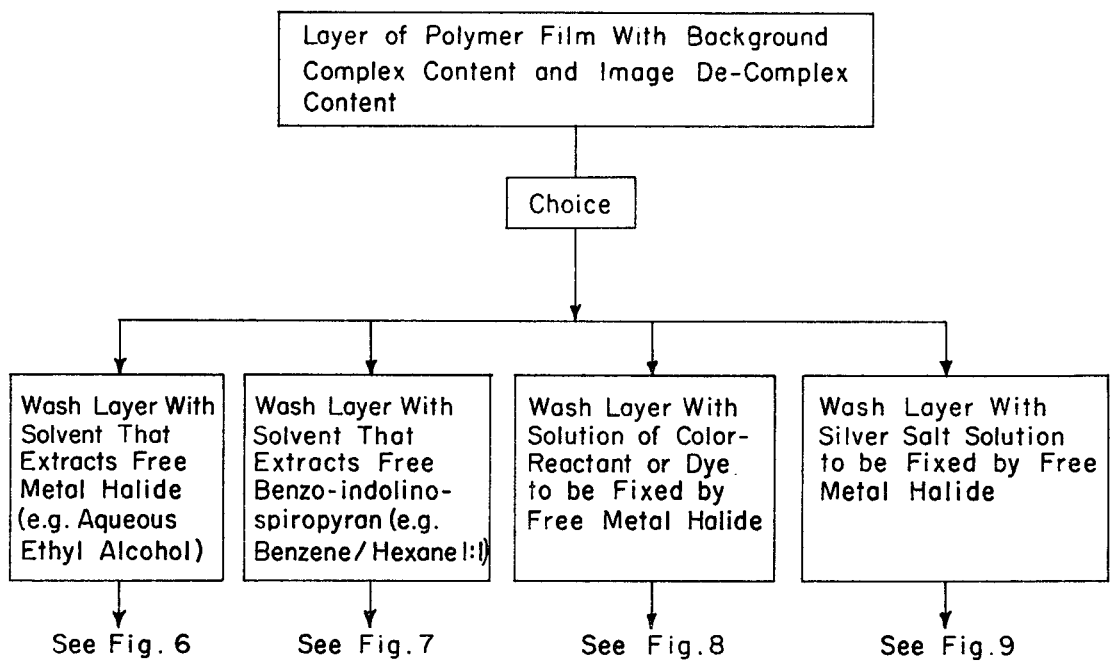

INVENTORS
PETER L. FORIS &
WILLIAM J. BECKER

United States Patent Office 3,510,308
Patented May 5, 1970

3,510,308
LIGHT SENSITIVE COMPLEXES OF BENZO-
INDOLINOSPIROPYRANS AND HALIDES OF
GROUP II–B METALS
Peter L. Foris and William J. Becker, Kettering, Ohio,
assignors to The National Cash Register Company,
Dayton, Ohio, a corporation of Maryland
Filed Dec. 20, 1965, Ser. No. 514,838
Int. Cl. G03c 1/52
U.S. Cl. 96—90                                30 Claims

ABSTRACT OF THE DISCLOSURE

This invention provides methods and materials for the creation of patterned images of molecular dimension on film by the formation in the dark of a red complex material between a benzoindolinospiropyran and a halide of a Group II–B metal dissolved in the film and the bleaching of the red complex to a pale yellow mixture of the uncomplexed components by incident visible light. Methods for subsequent erasure of the light-generated images, erasure of the images and re-exposure to give new images, incremental or add-a-frame exposures or erasures, and image-fixing are also provided.

---

This invention relates to a process for making permanent photo-images of molecularly-fine resolution, to the product, and to materials useful for practicing the process.

The invention more particularly pertains to a process for making permanent photo-images of high optical resolution in layers of polymeric film material which has in it, as sensitizing material, complex entities of the reaction product of (1) metallic-halide compound derived from Group II–B metals (cadmium, zinc, and mercury) combined with (2) benzoindolinospiropyran compound, such complex being formed in situ in the layer. Such complexes are of orange-red color, are formed in the layer as by warming in the dark to make the reaction go, and decomplex into their components in situ in the polymeric material film where struck by light of the visible spectrum band, the decomplexing of an area being visible because of the disappearance of the orange-red color and the appearance of a pale yellowish color.

The eligible benzoindolinospiropyran compounds form a group having the structure

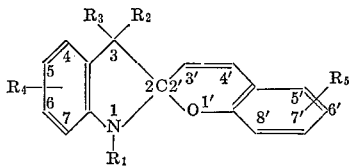

in which $R_1$, $R_2$, and $R_3$ are selected from the group consisting of methyl or higher alkyl group, and an aryl group, and each of $R_4$ and $R_5$ are one or more substituents selected from the group consisting of H, $NO_2$, Cl, Br, I, F, MeO, alkoxy, methyl, hydroxy, ethyl, and substituted phenyl.

The specification herein will use "complexing" as a means of identifying the feeble bonding of the metal halide to any of the above-specified benzoindolinospiropyran compounds, which latter material, from here on, will be identified generally by the acronym "BIPS," to which reference will be made from time to time in conjunction with the eligible derivatives. The decomplexing of the "feeble complex" is carried out by applying strong visible light radiation such as that associated with incandescent metal filament lamps, represented by the so-called "photo-flood" type of lamp. Since the utility of these "BIPS" compounds is to hold the metal halide molecule complexed only to a degree in which it may be set free by the impact of visible light, their action with the metal halides is the only sure criterion of their suitability as candidate "BIPS" materials eligible for use. This suitability may quickly be tested empirically by reacting the candidate compounds in a common liquid solvent medium with the necessary warmth in the dark, which evidences the "complexed" state by the appearance of an orange-red color and the "decomplexed" state being evidenced on exposure to visible light by the appearance of colorless or pale yellow color.

This specification makes no attempt at a theoretical consideration of the chemistry of the reversible process, except in general terms. The reversal of the complex to decomplexed state and return apparent can be repeated numerous times, no limit having been found. The invention will be described with reference to specified preferred and other eligible materials, and to preferred and other sequences of steps taken with such materials to obtain the end product in one form or another.

The whole process can be carried on, once the layer has been provided, at or near room temperature with ambient heat as the complex-forming energy, and with visible light to form a precursor image with its precision of outline limited on one hand only by the optical system, by which the visible light is applied and on the other hand only by the size of the "decomplexed" moieties in contact presence, which decomplexed moieties are held in a solid film polymeric material binder, at the place of generation, against migration.

The specified BIPS compounds are normally colorless but change to a blue color if the spiro-carbon-to-oxygen bond is broken by applied ultraviolet light. This phenomenon of coloring in ultraviolet light is not used in this invention, the choice of these compounds being dictated not by their inherent photochromic color potential but solely by their ability to form the photo-decomposable "feeble complexes" with the mentioned Group II–B metal-halide salts, with an accompanying distinct coloration of orange-red which is useful for indicating visually that the complexing reaction has taken place and that the material is therefore sensitized for use with imaging light.

The red complex units are split by light into two moieties, which are left in close contact physically and will combine in time with heat energy to re-form the red complex. When the image area consists largely of the light-split moieties, the area is yellowish. The yellowish image is the "precursor" image to be referred to later on in the specification. The split units may be said to be decomplexed.

The selected BIPS compound is dissolved in a liquid solution of a suitable polymeric film-forming material and the selected metal-halide to form a coating material which, when coated on a substrate and dried, reacts in the dark (especially with an elevated temperature environment) without more being done to form the orange-red layer. This complexed orange-red layer, which itself is a novel product, as well as is the composition coating solution material from which it was made, is kept in the dark, or in subdued light, and the desired image is impressed onto it by any selected photo-projection device and light source to "decomplex" the complexed entities in the area in which the photo-image is to be made. The consequent yellow direct photo-induced image will disappear in a few minutes or hours, depending on the ambient temperature, unless advantage is taken of its transient presence to produce in that area a fixed image, warmth engendering re-combination of the decomplexed associated moieties. This image of short life, measured in minutes or hours, or even days, depending upon the materials in the layer and the environment in which it is used, if not further processed and kept in the dark, will revert to the orange-red color and be available for use as it existed when first made. The layer with the precursor image must be protected from light, which would fog the background, until the layer is fixed.

While a reversible image is in existence in the film in terms of complexed and decomplexed areas, the film may be used as a photographic transparency as long as the light projected therethrough is insufficient to destroy the image in the time necessary to consummate the formation of the new photograph image, and before re-combination has a chance to occur. The components of the precursor transient image area of pale yellow hue are differentially soluble with respect to the background orange-red areas according to the properties of the solvent, and are reactable in various manners either to eliminate the image as respects one or both kinds of the moieties or to change their condition to provide a permanent material effect upon the layer as a visible whole. The "decomplexed" residual moieties consist on the one hand of free "BIPS" and on the other hand of free metal-halide, the "BIPS" moieties being available by physical contact for re-combination after the required passage of time in the dark, or, on the other hand, they may be acted upon before re-combination can occur by washing or chemical stabilization procedures, or both. Either the free metal-halide moieties may be used to combine with an added soluble silver salt which is subsequently converted to metallic silver, or they may be combined with an added reactant dye to form a fixed dye.

The decomplexed material is of molecular order of size, which size lends itself to micro-fine resolution of the image when reacted to the fixed form. The image material may be removed with the same resolution of pattern by moieties or entirely.

Inasmuch as the free "BIPS" moieties from the complex and the free metallic halide moieties from the complex are differentially soluble with respect to one another, either one or both kinds may be washed away out of the matrix of polymeric film layer, this washing itself constituting a form of process for stabilization of the associated area.

Among the manipulations that may be performed on the sensitized layer, after image formation by visible light, are:

(a) washing away the "BIPS" moiety;
(b) washing away the metal-halide moiety;
(c) washing away (a) and (b);
(d) reacting the metal-halide with soluble silver salt; or fixing an applied color reactant.

With these manipulations used individually, successively, or in combination, the invention may be used to create final products of utility in various operations subsequent to image formation, as selectively chosen, according to the charts set forth in the drawings and as explained further on in the specification. To further such purpose and use, the film material is made relatively thin. As the film must be subject to liquid diffusion of the dissolved solids throughout to accomplish the purpose, it is selected to be pervious to solutions of materials with which the free decomplexed moieties of the former complex units may be reacted. The metal-halide component may be washed out with an aqueous solvent, leaving the "BIPS" component, and the latter may be washed out with a non-polar solvent. The solvents chosen for the various operations must not degrade the film layer matrix.

If it is desired to manipulate the background area not originally flooded with the imaging light, then both kinds of the residual unit moieties in the direct image area are washed away with a combination solvent such as aqueous alcohol. Thereafter, either the background is flooded with light to decomplex the whole background of the image area, which then is turned to a metallic state or to a permanent dye state, or else a new image may be made in this background area in an add-a-frame manner, as would be desirable in adding to, say, a recorded image of data made from time to time in different areas. This possibility of manipulating the direct image area of the background and setting it to a permanent state is of great value in making use of the invention.

Therefore, once the precursor image in the film is formed either as a direct image or as a part of the manipulation of the background area of what was a direct image, instead of fixing the materials, they may be removed completely to provide a non-sensitive stable area to be used as desired; for example, such clear area may be used to become a photographic light passage, whereas the remaining material interferes with the passage of projected light either by the absorption of color or by its total blocking of the light rays.

It will be understood that the decomplexing step takes place in a film of polymeric material and that the products—moieties—of the decomplexing step remain motionless (in the sense of being non-migratory) in situ, there to be utilized without any substantial free migration of such in a sidewise diretcion in the film, thus retaining the high resolution of the image in terms of the said decomplexed moieties, as is afforded by the degree of resolution of the incident visible imaging light rays.

Once a permanent stabilized image is formed from the decomplexed moieties, either in the direct image area or in the background area, the rest of the materials, being not permanently stabilized, may be removed as desired if they interfere for any reason with the utilization of the stabilized image-portion of the layer. It is a fact that, in most instances of use, the polymeric film material that is a residue is not in the way of the use of the product.

The foregoing properties of the novel photo-responsive layer of material permit the use of small areas of it in the add-a-frame manner, where image-data is added to the unused areas at intervals as and where desired or needed, such property of the layer providing even for the formation of added images of different color, as will be explained.

With these and incidental objects of the invention in view, which will become apparent in the specification which follows, the invention will be described fully with reference to drawings which are, and must of necessity be, highly diagrammatic in form, but which portray the steps of the process and the conditions prevailing in the novel layer after each of the operational steps until the final desired image pattern and image content are reached. The layer, if desired, may be self-supporting or, on the other hand, be supported on the surface of other material.

Of the drawings:

FIG. 1 shows, in perspective diagrammatic form, the novel layer of photo-responsive material supported on a glass substrate, the thickness of the layer relative to the substrate being of no importance, but the layer itself usually being of the thickness of only several thousandths of an inch.

FIG. 2 shows, in perspective, the novel layer without a substrate support.

FIG. 3 shows how an image (N) may be formed in the supported photo-responsive layer of FIG. 1, by incident light controlled by a stencil, to form a precursor bleached (decomplexed) area, this being one way of delineating an image by use of projected light. Other image-forming light portrayal means are a light beam trace; optically focused light patterns; transparent negatives; or movement of the layer with respect to a fixed beam of light, all to be used either alone or in combination as desired.

FIG. 4 is a flow sheet of the steps and the materials necessary to prepare a composition for forming the light-sensitive layer in one manner, and the preparation of the layer and its final sensitization by warming, together with the step of impressing an image thereon by visible light.

FIG. 5 is a diagrammatic showing of four possible lines of procedure by which the invention may be employed to reach a final product, reference being made under each choice of procedure to the corresponding one of the drawings FIGS. 6, 7, 8, and 9 for the further steps to be taken in the direction associated with the choice.

Figure 6:
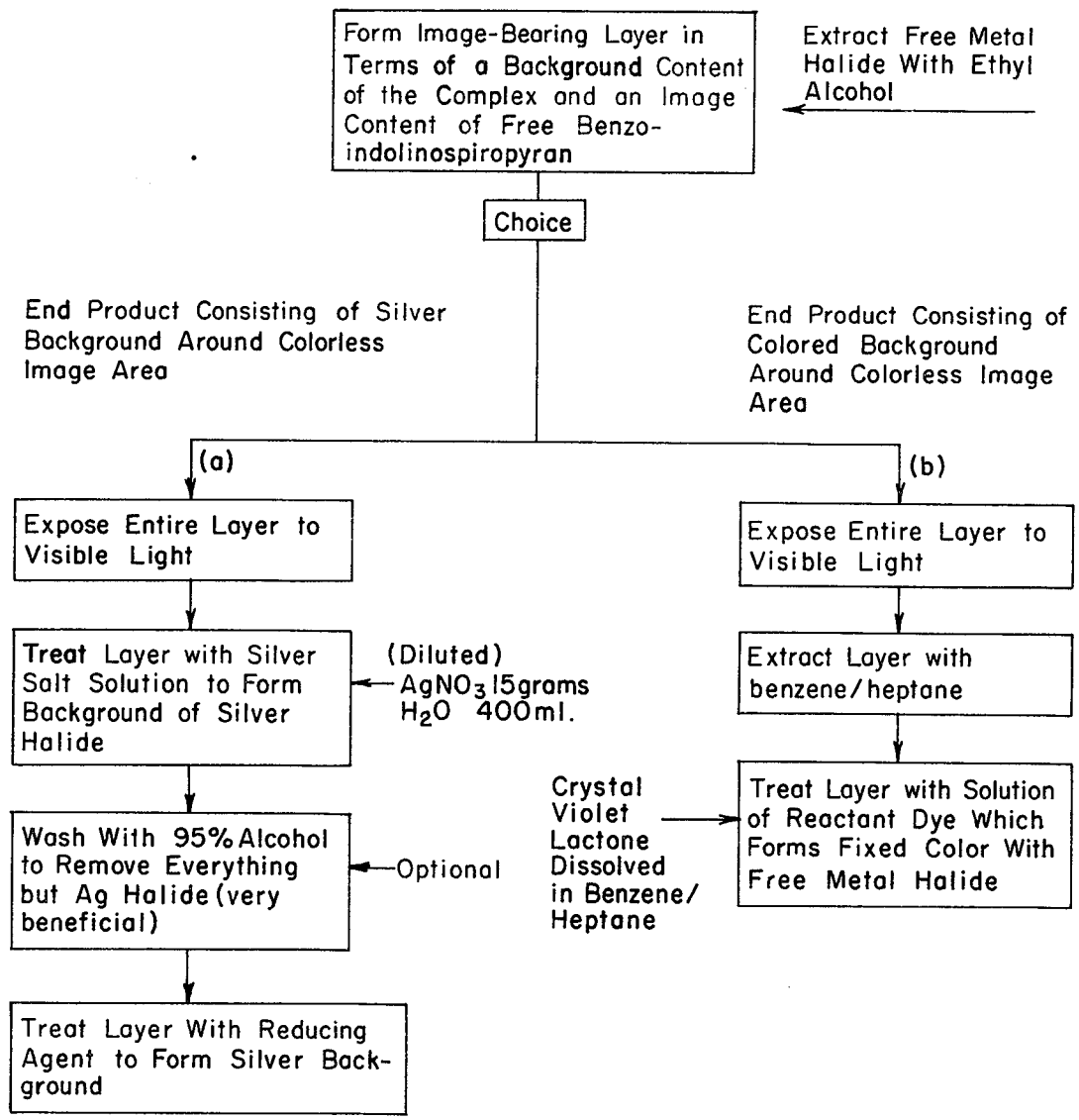

FIG. 6 is a flow diagram for that line of the further procedure in which the first step is the extraction from the image area of the free metal halide moiety with aqueous ethyl alcohol, such extraction step allowing still further procedure along either one of two subsequent lines, one of which subsequent lines results in an end product of a silver background around a colorless image area and the second of which subsequent lines results in an end product consisting of a colorless background around a dye-colored image area.

Figure 7:
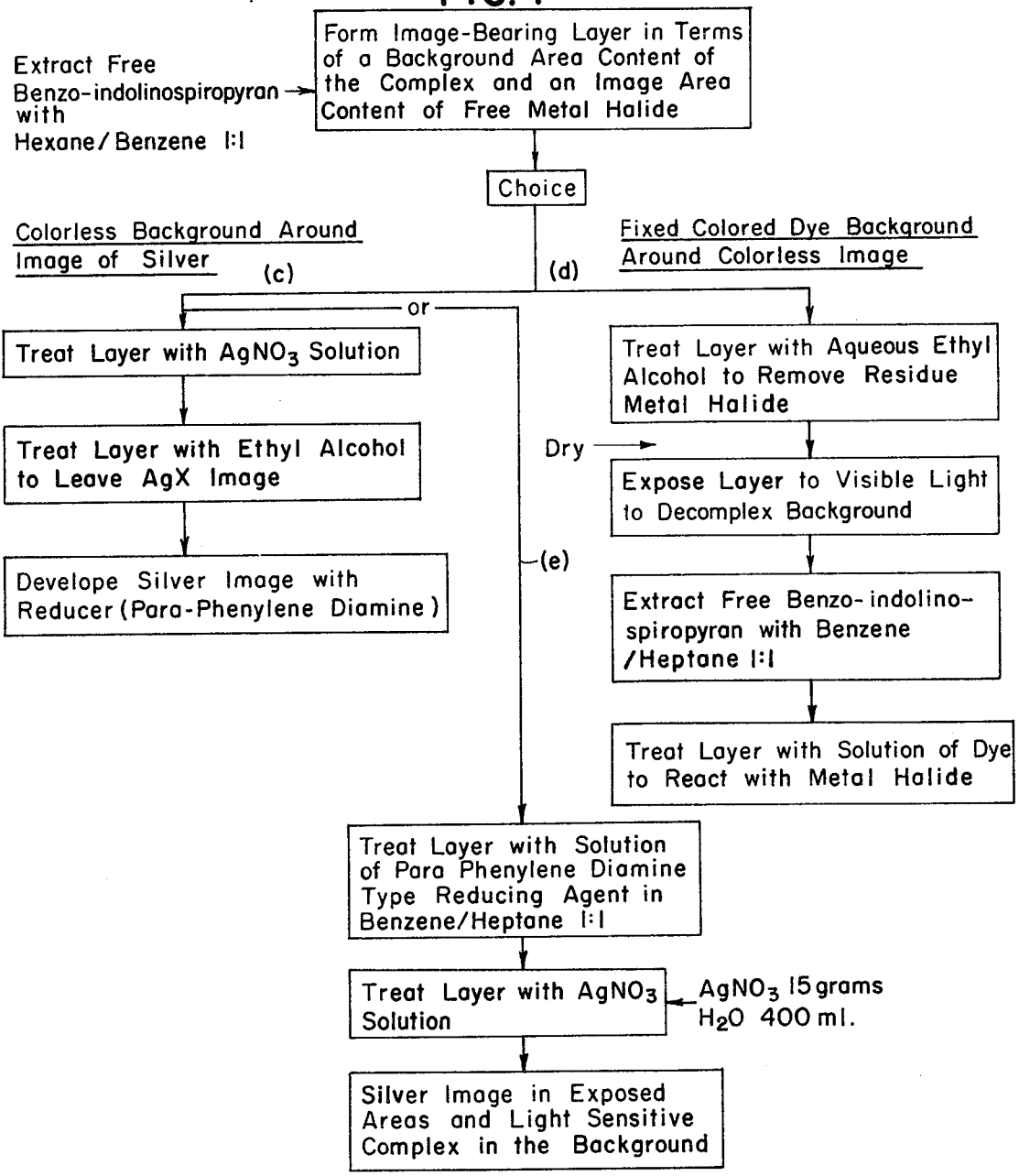

FIG. 7 shows that lines of procedure in which the first step is the extraction of the free benzoindolinospiropyran moiety from the image area with a hexane/benzene mixture, such a step being followed by a choice of treating the layer with the silver nitrate solution, finally to develop a metallic silver image; that line of procedure in which the layer is treated with aqueous ethyl alcohol to remove the residue metal halide moieties, followed by a subsequent exposure of the layer to visible light to decomplex the background area, extracting the BIPS, and finally treating the layer with a solution of a dye reactant; and that choice in which the silver image is formed by first treating the layer with a reducing agent and then with a silver salt.

Figure 8:
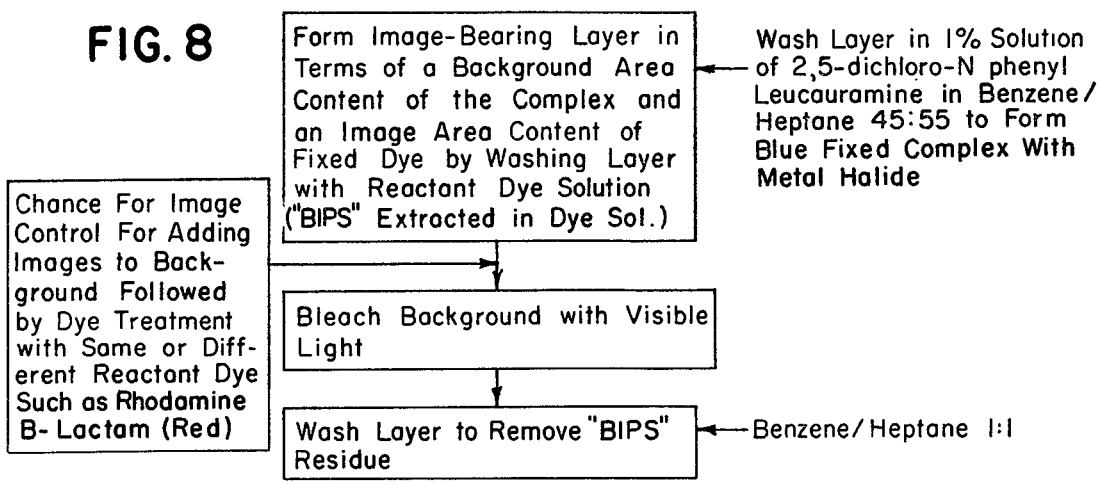

FIG. 8 is a flow diagram in which the layer, after formation of the image by visible light, is treated with a solution of reactant dye which forms a colored metal halide dye image, with or without the bleaching of the background, as will be described. This shows how an add-a-frame image can be added to the background area.

Figure 9:
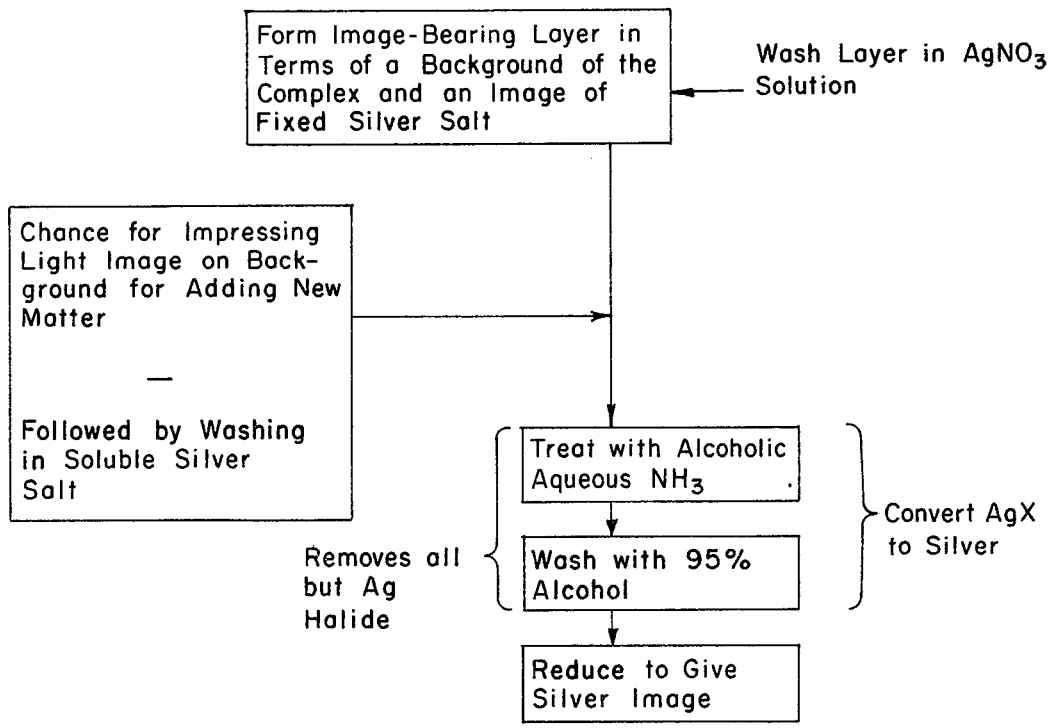

FIG. 9 shows that line of procedure, after the formation of the image with visible light, consisting of washing the layer with a silver nitrate solution and then treating the layer to give a silver image. FIG. 9 illustrates the add-a-frame procedure.

All the foregoing procedures will be gone into in detail, and instructions will be given to enable one skilled in the art to practice the invention.

There has been described the method by which the benzoindolinospiropyran eligibility tests are made, generally, so that materials of this class may be selected as proven eligible for use in the process. It is to be understood that the particular substituents on the benzoindolinospiropyran compound are of no great importance in and of themselves except that they lend properties and compatible performance in the formation of the feeble complexes in a particular combination of matrix material and agents, the particular use of the BIPS compound being in its ability to form complexes with the specified metal halides that are of such a "feeble" character as to be decomplexed by the incidence of visible light thereto while in solution in the film, it being understood that the layer comprises a solution in the solid state. A few negative limitations on the choice of compounds are to be observed. First, the BIPS compound nucleus shall have something else besides hydrogen substituted in the 1,3,3 positions and shall not have a substitution of a "naphtho" type on any of the rings. Generally speaking, then, all of the derivatives of benzoindolinospiropyran are available for use, including the parent compound, save those which are rendered incapable of forming a specified light-severable metal-halide complex, and those will be identified as the "complexing" type of these compounds to earmark them for claiming, wherein they will be referred to as "the specified BIPS." The generalized structure of the eligible BIPS compounds was given earlier. The BIPS compounds may be made by the method disclosed in United States Patent No. 3,100,778, which issued Aug. 13, 1963, on the application of Elliot Berman, and in which are shown a large number of compounds which are eligible for use in practicing this invention, although in said patent the compounds are disclosed for their "photochromic" characteristic, in that they form a distinctive color when exposed to ultraviolet light while in solution. It is to be emphasized that these compounds useful in the practice of this invention are selected not for their photochromic activity (which is incidental) but for their ability to form light-severable complexes with metal halides. Nevertheless, a way in which the compounds are made is the same as that shown in the mentioned patent; that is, by condensing the selected salicylaldehyde derivative with the selected substituted indoline. That patent shows the use of 2-methylene-1,3,3-trimethyl-indoline for reaction with the selected salicylaldehyde to form the 1,3,3 methyl-substituted derivative compounds which are especially useful in practicing the invention. The patent shows the preparation of a number of substituted salicylaldehydes, and from these will be taken, as representative, the making of the 5',7'-dichloro, 6'-nitro BIPS derivative. This compound is made by condensing 2-methylene-1,3,3 methyl indoline and 4,6-dichloro-5 nitro salicylaldehyde according to the following reaction, shown structurally:

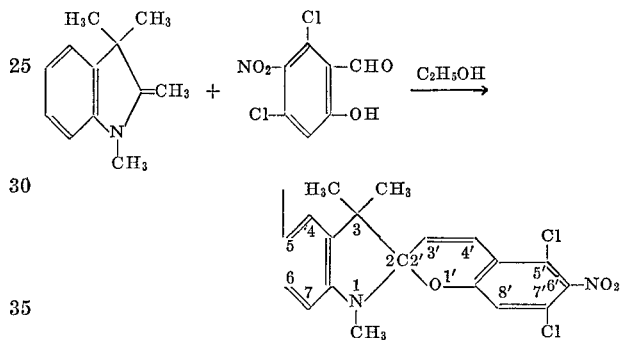

which is carried out specifically as follows:

In a 250-milliliter round-bottom flask fitted with a Friedrich condenser are placed 100 milliliters of absolute ethanol, 3.46 grams (0.02 mole) of 2-methylene-1,3,3-trimethyl-indoline, and 4.72 grams (0.02 mole) of 4,6-dichloro-5-nitrosalicylaldehyde. The resulting purple solution is refluxed for two hours and then cooled in an ice bath to produce a crystalline precipitate. The crystalline precipitate is recovered by filtration, washed in cold ethanol, and air-dried. The yielded product is 1,3,3-trimethyl-indoline - 5',7' - dichloro-6'-nitro benzopyrylospiran. This product is termed the 5',7'-dichloro-6'-nitro BIPS derivative. Reference to the aforesaid United States Patent No. 3,100,778 should be had for methods for making thousands of other useful derivatives of the BIPS compound, and reference is further made to United States Patent No. 3,022,318, which issued Feb. 20, 1962, to Elliott Berman and David B. McQuain, and which sets forth other candidates for eligible compounds which form light-severable complexes with metal halides.

Other references to the benzoindolinospiropyran compounds appear in publications as early as 1940, which are listed below:

Wizinger et al.: Helvetica Chimica Acta, Volume 23, pages 247–271 (1940).

Koelsch et al.: J. Amer. Chem. Soc., Volume 74, pages 6288–9 (1952).

Claude et al.: Compt. Rendus, Volume 236, pages 697–699 (1953).

Hirshberg et al.: J. Chem. Soc. (London), pages 3129–37 (1954).

Hirshberg: J. Amer. Chem. Soc., Volume 78, pages 2304–12 (1956).

Berman et al.: J. Amer. Chem. Soc., Volume 81, pages 5605–5608 (1959).

The classes of metallic salts eligible for practicing the invention are the halide salts of a metal selected from the group consisting of zinc, cadmium, and mercury (and combinations of them in any proportions). These will be claimed as the specified halide salts of Group II–B metals.

Following are examples of the practice of the invention:

EXAMPLE I

In this, the preferred, embodiment of the invention, a film-forming drying coating composition, suitable for making a dried coating of several thousandths of an inch on a substrate material such as glass, is prepared by first forming a solution of a film-forming organic polymeric material in liquid organic solvent(s) material to form a sirup-like product in which the selected specified BIPS and the selected specified metal halide salts are dissolved in substantially equi-molar amounts up to five percent by weight. Specifically, a binder solution of 100 grams of powdered cellulose acetate butyrate, which may be Eastman's "Half-Second Butyrate," swollen with 275 grams of toluene is dissolved in 175 grams of methyl ethyl ketone. Cellulose acetate butyrate is resistant as a film with or without an adherent substrate to the processing agents used in these examples. Equivalents will be named hereafter.

In general, in addition to cellulose acetate butyrate compounds, of which there are a number which are distinguished by the ratio of acetate to butyrate content, which are good film formers yet are previous to the classes of solvents and liquid reactants of the organic and inorganic classes typified by toluene, ethanol, methyl ethyl ketone, and aqueous silver salt solutions and not dissolved thereby if used in judicious amounts, also eligible are film-forming organic polymeric materials such as cellulose acetate, cellulose butyrate, ethyl cellulose, acrylic polymers, polyvinyl formal and butyral, and polyvinyl acetate. In the use of all of these materials, due to the fact that thin films of them are used, any particular one of these materials can easily be empirically tested on a glass plate for its survival characteristics as a film when treated with the particular solvents and other liquids to be employed in the particular form of the invention to be undertaken.

To 55 grams of the binder solution are added 1.225 grams of anhydrous zinc bromide ($ZnBr_2$) in 10 milliliters of absolute ethanol, and 1.963 grams of 1,3,3-trimethylindoline-5-chloro-6'-nitro-benzopyrylospiran, and the mixture is warmed until solution is effected. An excess of BIPS is desirable to eliminate the possible presence of free $ZnBr_2$. Thus the metal halide (1) and non-naphtho, substituted benzoindolinospiropyran (2) can be present in proportions ranging from substantially equimolar to an excess of said benzoindolinospiropyran. A dried coating made onto glass with this solution may be converted to the photosensitive red-orange complex salt form of the dissolved materials by heating the coating on the substrate in the dark at 75 degrees centrigrade for some minutes (15 minutes ±5 minutes). The liquid solution composition before coating, and when dried, and the film substrate product in all stages of production are considered novel proprietary materials provided by this invention and will be claimed specifically and broadly in intermediate and final form.

The substrate 21 with the dried coating 20 (FIG. 1) and the self-supporting film 20a (FIG. 2) are different gross physical forms of the sensitive product, the phantom lines on the drawings indicating an environment of subdued light or total darkness.

The preparation of the layer just given is shown with some further specific data on materials in FIG. 4.

FIG. 3 shows one method of forming a precursor image, and that is by projecting light through a stencil onto the sensitive surface of the light-sensitive device of FIG. 1, whereby a yellowish image of a multitude of decomplexed moieties of molecular dimensions appear against a background of a multitude of complexed red-orange molecular entities.

The layer of FIG. 4 may be utilized by the choice of methods provided in truncated outline in FIG. 5 as concluded in the case of each identified choice by further indicated ones of the flow charts, FIGS. 6 to 9 inclusive.

The preferred embodiment of the invention adopts the course of procedure shown in FIG. 6, which relates to the extraction of free metal halide moieties from the image area. The course of procedure shown in FIG. 6 includes a further and secondary choice as to what end product it is desired to produce; to wit, there is a choice as to producing (a) a silver background around a colorless (clear) image area, or
(b) a colored background around a colorless (clear) image area.

The silver background form of the invention (a) is considered the preferred form of the invention and appears as Example I, and the colored background form of the invention (b) is considered as Example II.

Referring to FIGS. 5 and 6, FIG. 5 indicates that the layer first is washed with aqueous ethyl alcohol to extract the free metal halide, which condition leaves the image area having a content of free BIPS. Next, the leg (a) of the diagram shows that the entire layer is exposed to visible light to decomplex the background area.

The layer extracted with aqueous alcohol and exposed to light all over next is treated with a silver salt solution adapted to form silver halide entities of the halide moieties of the background area. The silver salt solution is made up from a silver nitrate stock formed by dissolving 15 grams of silver nitrate in 400 milliliters of water. The layer-treating solution is made up of 25 milliliters of the stock solution, 65 milliliters of water, and 10 milliliters of 95% ethanol, the latter ingredient improving penetration of the layer. Hereafter, this same silver halide wash is to be considered as used where a silver halide solution is specified, but it is representative only and is not specified exactly for purposes of limiting the invention. It is beneficial at this point, but not necessary, to wash the layer with ethyl alcohol to remove everything from the layer except the silver halide. The layer then is treated with a silver halide reducing (developing) agent and rinsed in water. A suitable developing agent includes the following mixture:

Ethyl alcohol—40 milliliters
10% aqueous sodium hydroxide solution—10 milliliters
N-(p-hydroxy phenyl) glycine—½ gram
Water—50 milliliters In this preferred form, 55 grams of binder solution is used with 1.963 grams of the BIPS compound and 1.225 grams of the metal halide compound. The concentration of the solutes may be varied considerably in either direction; to wit, using the same amount of reactants, there could be used only 27.5 grams of the binder solution or as much as 550 grams thereof.

EXAMPLE II

This aspect of the invention is concerned with the formation of a colored background around a colorless (clear) image are and follows the course of leg (b) of the chart of FIG. 6. After the free metal halide has been washed from the image area of the layer with aqueous ethyl alcohol, the whole layer is subjected to visible light, as in Example I, to decomplex the light-sensitive content of the background portion of the layer. This is done just as in Example I except that the wash-out of the layer is carried out with a 1:1 mixture of benzene and heptane or equivalent, to wash out the BIPS moiety. This resultant metal-halide-containing background layer is treated with a solution of crystal violet lactone, which combines with the metal halide to form a fixed blue color. The metal halide moieties form fixed color with other dye bases in known manner.

EXAMPLE III

In this example (FIG. 7), the photo-exposed layer 20 is washed with organic liquid solvents (1:1 hexane-benzene) to rid the image area of the free BIPS moieties, which leaves the image area with free metal halide moieties. Here, the organic-solvent-washed layer 20 is subject to a choice of treatment indicated by the procedure of leg (c) if the image area is to be of silver with a colorless (clear) background; by the procedure of leg (d) if the image area is to clear and the background a color; or by the procedure of leg (e) to obtain a silver image with a background of color.

For example III, leg (c) will be followed, legs (d) and (e) forming the subject matter of Examples IV and V.

Following leg (c) (FIG. 7), washing the layer with the organic solvent leaves the image area containing moieties of free metal halide. Following the procedure of leg (c), the layer 20 is treated with the before-specified silver nitrate solution to form a silver salt image within a background of the original layer material bearing the complex entities. Next, the layer is washed with 95% ethyl alcohol, which decomplexes the background complex material and washes it out. The last step is to reduce the silver salt of the image area by conventional treatment, such as a liquid solution of para-phenylene diamine, or as indicated in the previous example.

EXAMPLE IV

This is carrying on the process aspect of FIG. 7 as restricted to leg (d) to form a fixed color dye background around a colorless (clear) image area. The layer left after washing with the organic solvent to remove the BIPS moieties in the image is treated with 9:1 water-ethanol solution to remove the residual metal halide moieties from the image area. The layer then is flooded with light to decomplex the background area, and the free BIPS moieties are extracted with the specified benzene/heptane 1:1 mixture. The layer then is treated with a liquid solution of a basic dye to react with the residual metal halide to form a fixed color.

EXAMPLE V

In this example, the process of leg (e) of FIG. 7 is followed by treating the organic-solvent-extracted layer first with a silver-salt-reducing agent solution, as specified before, and thereafter with the aqueous silver nitrate solution to form an image of silver and a light-sensitive background, suitable for add-a-frame manipulation.

EXAMPLE VI

In this example (FIG. 8), the layer 20, having the image precursor made thereon by light in terms of BIPS moieties and metal halide moieties, is washed with a 1% solution of 2,5-dichloro-N-phenyl leucauraine in 45:55 benzene/heptane, the leucauramine reacting with the metal halide moieties to form dye salts (fixed) the washing also serving to wash out the BIPS moieties. This gives a fixed first image and leaves the background susceptible to another image (the second image) formation by light, with add-a-frame significance. This second image may be fixed as a dye, the same as the first image, and the same or different dye reactants can be used. If the first image is made blue by use of the leucauramine, for instance, the second image may be made red by using Rhodamine B Lactam, the final fixing being made by flood-lighting and washing the unused portions of the layer.

EXAMPLE VII

This process example is shown in FIG. 9. An image is formed in the layer 20, and the layer is washed in a solution of a silver salt, such as the specified silver nitrate solution. This gives, as a starting product, a silver salt image layer with a background of the complexed starting material of BIPS-metal halide. The unused background may be subjected to the same image formation and silver salt washing in an add-a-frame manner. After the imaging step has been completed, the layer is successively washed in alcoholic aqueous ammonia solution and 95% alcohol (ethanol) to wash away all but the silver halide image, which is converted to silver by washing with a solution of a reducer. This can be repeated in a fresh area.

The foregoing examples are concerned mainly with processing steps and preferred materials for carrying on the processing in a conventional manner as far as washing solutions and substitution materials are concerned. Once the rationale of the invention is given, as is the case with the foregoing examples, for using the preferred specified materials, the substitution of equivalents is quite obvious to those familiar with dye fixation and silver substitution in the photography arts.

The main points of the invention are the provision of the novel layer containing the photo-severable complexes of a BIPS material and a Group IIB metal halide salt, and the manipulative steps following one or more photoimaging steps to sever the complexes into individually-reacting moieties.

As indicated, the invention will be claimed with respect to the primary, intermediate, and final products, and to the processes for making these products.

What is claimed is:
1. Photographic material comprising
   (1) halide salt component of a metal selected from the group consisting of cadmium, zinc and mercury and
   (2) non-naptho, substituted benzoindolinospiropyran component having the structure

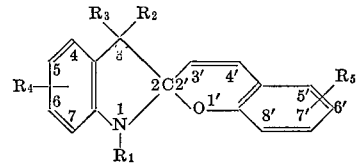

in which $R_1$, $R_2$ and $R_3$ are selected from the group consisting of methyl or higher alkyl group and an aryl group, and each of $R_4$ and $R_5$ are one or more substituents selected from the group consisting of H, $NO_2$, Cl, Br, I, F, MeO, alkoxy, methyl, hydroxy, ethyl and substituted phenyl, in
   (3) a solid film of substantially water-insoluble polymeric material which passes visible light, said halide salt and substituted benzoindolinospiropyran forming a complex upon warming in the dark as indicated by development of color, which complex upon exposure to visible light yields a decomplexed form as indicated by bleaching of said color and wherein said complexed and decomplexed forms are differentially soluble.

2. A photographic material as in claim 1 wherein (1) and (2) are present in proportions ranging from substantially equimolar to an excess of (2).

3. A photographic material as in claim 1 wherein said polymeric material is translucent to visible light.

4. A photographic material as in claim 1 wherein components (1) and (2) of said decomplexed form are differentially soluble.

5. A photographic material as in claim 1 wherein components (1) and (2) are in complexed form in all areas of said film.

6. A photographic material as in claim 1 wherein components (1) and (2) are complexed in certain areas of said film and decomplexed in other areas of said film.

7. A photographic material as in claim 6 wherein said decomplexed areas constitute a precursor image and said complexed areas constitute background.

8. A photographic material as in claim 7 wherein said precursor image is a fixed image.

9. A photographic material comprising a solid film of substantially water-insoluble polymeric material, which passes visible light, having image area and background area contained in said film, said image area being comprised of (1) halide salt of a metal selected from the group consisting of cadmium, zinc and mercury and said background area being comprised of said halide salt (1) and (2) non-naphtho, substituted benzoindolinospiropyran capable of forming a complex with said halide salt upon warming in the dark as indicated by development of color, having the structure

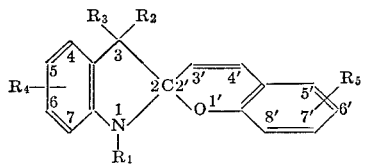

in which $R_1$, $R_2$ and $R_3$ are selected from the group consisting of methyl or higher alkyl group and an aryl group, and each of $R_4$ and $R_5$ are one or more substituents selected from the group consisting of H, $NO_2$, Cl, Br, I, F, MeO, alkoxy, methyl, hydroxy, ethyl and substituted phenyl.

10. A photographic material as in claim 9 wherein (1) and (2) are in complexed form in said background area.

11. A photographic material as in claim 9 wherein (1) and (2) are in decomplexed form in said background area.

12. A photographic material comprising a solid film of substantially water-insoluble polymeric material, which passes visible light, having image area and background area contained in said film, said image area being comprised of silver halide and said background area being comprised of (1) halide salt of a metal selected from the group consisting of cadmium, zinc and mercury and (2) non-naphtho, substituted benzoindolinospiropyran capable of forming a complex with (1) upon warming in the dark as indicated by development of color and having the structure

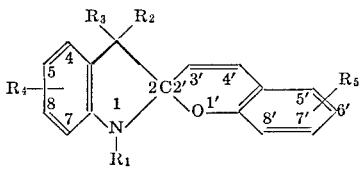

in which $R_1$, $R_2$ and $R_3$ are selected from the group consisting of methyl or higher alkyl group and an aryl group, and each of $R_4$ and $R_5$ are one or more substituents selected from the group consisting of H, $NO_2$, Cl, Br, I, F, MeO, alkoxy, methyl, hydroxy, ethyl and substituted phenyl.

13. A photographic material as in claim 12 wherein (1) and (2) are in complexed form.

14. A photographic material comprising a solid film of substantially water-insoluble polymeric material, which passes visible light, having image area and background area contained in said film, said background area being comprised of (1) halide salt of a metal selected from the group consisting of cadmium, zinc, and mercury and (2) non-naphtho, substituted benzoindolinospiropyran capable of forming a complex with (1) upon warming in the dark as indicated by development of color and having the structure

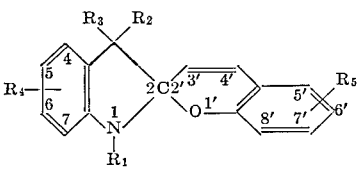

in which $R_1$, $R_2$ and $R_3$ are selected from the group consisting of methyl and higher alkyl group and an aryl group, and each of $R_4$ and $R_5$ are one or more substituents selected from the group consisting of H, $NO_2$, Cl, Br, I, F, MeO, alkoxy, methyl, hydroxy, alkyl and substituted phenyl and said image area being comprised of said substituted benzoindolinospiropyran.

15. A photographic material as in claim 14 wherein (1) and (2) in said background area are in complexed form.

16. A photographic material comprising a solid film of substantially water-insoluble polymeric material, which passes visible light, having fixed image area and background area capable of becoming image area contained in said film, said background area being comprised of (1) halide salt of a metal selected from the group consisting of cadmium, zinc and mercury, and (2) non-naphtho, substituted benzoindolinospiropyran capable of forming a complex with (1) upon warming in the dark as indicated by the development of color and having the structure

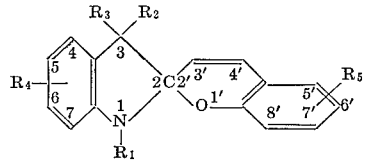

in which $R_1$, $R_2$ and $R_3$ are selected from the group consisting of methyl and higher alkyl group and an aryl group, and each of $R_4$ and $R_5$ are one or more substituents selected from the group consisting of H, $NO_2$, Cl, Br, I, F, MeO, alkoxy, methyl, hydroxy, ethyl and substituted phenyl and said fixed image area being comprised of the reaction product of (1) and a dye that becomes fixed as to color by said reaction.

17. A photographic material as in claim 16 including additional image areas comprised of (1) and (2) in decomplexed form in said film.

18. A photosensitive film-forming solution comprising readily evaporable organic solvent in which are dissolved substantially water-insoluble, film-forming polymeric material, halide salt of a metal selected from the group consisting of cadmium, zinc and mercury and non-naphtho, substituted benzoindolinospiropyran capable of forming a complex with said halide salt upon warming in the dark as indicated by development of color having the structure

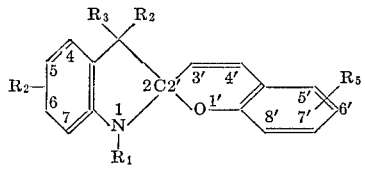

in which $R_1$, $R_2$ and $R_3$ are selected from the group consisting of methyl or higher alkyl group and an aryl group, and each of $R_4$ and $R_5$ are one or more substituents selected from the group consisting of H, $NO_2$, Cl, Br, I, F, MeO, alkoxy, methyl, hydroxy, ethyl and substituted phenyl, said polymeric material providing a film matrix, which passes visible light, for said halide salt and said substituted benzoindolinospiropyran upon evaporation of said solvent.

19. A solution as in claim 18 wherein said polymeric material is cellulose acetate butyrate.

20. A solution as in claim 18 wherein said halide salt is zinc bromide.

21. A process for making a photographic element including the steps of
(a) providing a substantially water-insoluble solid polymeric film matrix, which passes visible light, containing two differentially soluble components (1) halide salt of a metal selected from the group consisting of cadmium, zinc and mercury and (2) non-naphtho, substituted benzoindolinospiropyran, which forms a complex with (1) upon warming in the dark as indicated by development of color and having the structure

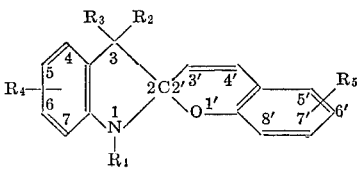

in which $R_1$, $R_2$ and $R_3$ are selected from the group consisting of methyl or higher alkyl group and an aryl group, and each of $R_4$ and $R_5$ are one or more substituents selected from the group consisting of H, $NO_2$, Cl, Br, I, F, MeO, alkoxy, methyl, hydroxy, ethyl and substituted phenyl, and;

(b) forming an image in said film by application of visible light to selected areas of said film, which areas are to represent an image which is self-erasing in time directly related to temperature.

22. A process as in claim 21 including, subsequent to said image formation (b), (c) extracting from the image area of said film at least one of said differentially soluble components by washing said film with selective solvent therefor.

23. A process as in claim 22 in which component (1) is extracted leaving component (2) in said image areas.

24. A process as in claim 23 including, subsequent to said extraction (c), (d) exposing the entire film to visible light;
(e) washing said film with silver nitrate solution to form silver halide in the background area of said film; and
(f) reducing said silver halide to metallic silver.

25. A process as in claim 23 including, subsequent to said extraction (c), (d) exposing the entire film to visible light;
(e) washing said film with solvent specific to component (2) to extract it from said film; and
(f) treating said film with reactant dye solution to form a fixed color with the remaining component (1) in the background areas.

26. A process as in claim 22 wherein component (2) is extracted leaving component (1) in said image areas.

27. A process as in claim 26 including, subsequent to said extraction (c), (d) treating said film sequentially first with silver nitrate solution to form a silver halide image and then with ethyl alcohol to remove the background area; and
(e) reducing said silver halide to yield a metallic silver image in said film.

28. A process as in claim 26 including, subsequent to said extraction (c), (d) treating said film with a solution of reducing agent for silver nitrate; and
(e) treating the film resulting from (d) with silver nitrate solution to form a silver image with the background area still being sensitive to visible light.

29. An add-a-frame process for making an array of images in a substantially water-insoluble polymeric layer, which passes visible light, containing (1) halide salt of a metal selected from the group consisting of cadmium, zinc and mercury and (2) non-naphtho, substituted benzoindolinospiropyran capable of forming a complex with (1) upon warming in the dark as indicated by development of color and having the structure in which $R_1$, $R_2$ and $R_3$ are selected from the group consisting of methyl or higher alkyl group and an aryl group, and each of $R_4$ and $R_5$ are one or more substituents selected from the group consisting of H, $NO_2$, Cl, Br, I, F, MeO, alkoxy, methyl, hydroxy, ethyl and substituted phenyl, including the steps of (a) successively forming images in different areas of said layer by subjecting said areas to data-representing configurations of visible light;
(b) after formation of at least one image in (a), washing said layer with a solution of dye that reacts with (1) to yield a fixed image; and
(c) thereafter washing said layer with selective solvent for (2).

30. An add-a-frame process for making images in different areas of a film at different times in a provided substantially water-insoluble polymer film, which passes visible light, containing (1) halide salt of a metal selected from the group consisting of cadmium, zinc, and mercury, and (2) non-naphtho, substituted benzoindolinospiropyran capable of forming a complex with (1) upon warming in the dark as indicated by development of color and having the structure in which $R_1$, $R_2$ and $R_3$ are selected from the group consisting of methyl or higher alkyl group and an aryl group, and each of $R_4$ and $R_5$ are one or more substituents selected from the group consisting of H, $NO_2$, Cl, Br, I, F, MeO, alkoxy, methyl, hydroxy, ethyl and substituted phenyl, including the steps of (a) successively forming images in selected areas by use of visible light;
(b) after formation of at least one image in (a), washing said film with silver nitrate solution to form fixed silver salt images, all of the successive images finally being converted to silver salt by said washing; and
(c) treating said film with selective solvents to remove all but the silver salt images.

References Cited

UNITED STATES PATENTS 3,152,903  10/1964  Shepard et al. _____ 96—90
3,364,023  1/1968   Becker et al. _____ 96—27

NORMAN G. TORCHIN, Primary Examiner

R. E. FICHTER, Assistant Examiner

U.S. Cl. X.R.

96—27; 252—300